United States Patent Office 2,864,995
Patented Dec. 16, 1958

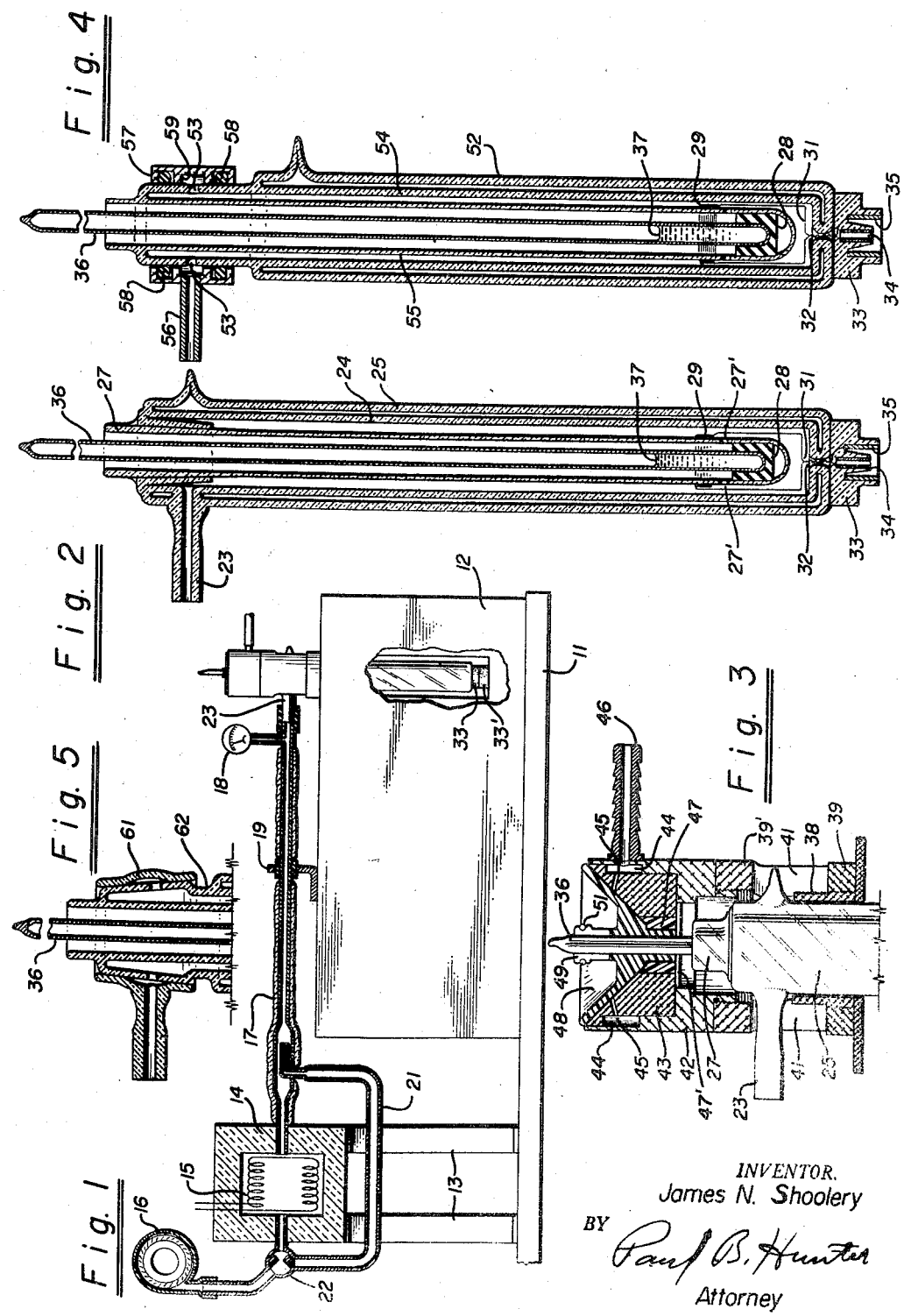

2,864,995

APPARATUS FOR CONTROLLING THE TEMPERATURES OF OPERATION IN GYROMAGNETIC RESONANCE SPECTROSCOPY

James N. Shoolery, Palo Alto, Calif., assignor to Varian Associates, San Carlos, Calif., a corporation of California Application November 26, 1956, Serial No. 624,457

20 Claims. (Cl. 324—.5)

This invention relates in general to gyromagnetic resonance spectroscopy and more particularly to a novel apparatus for applying and controlling a heating or cooling fluid to a gyromagnetic resonance sample for conducting nuclear magnetic resonance spectroscopy analysis at selected temperatures.

In high resolution nuclear magnetic resonance spectrometers, it is desirable to provide a means for changing the temperature of the samples being analyzed relative to room temperature since, for example, heating liquid samples results in a general increase in the solubilities with temperature and since many solid substances can be melted without decomposition and thereby be more easily analyzed. Furthermore, chemical reactions which one desires to observe often proceed at much more convenient rates for kinetic studies when the temperature is raised, and the change of reaction rates with elevated temperatures permits evaluation of activation energies. Also, in many instances, interesting properties of samples may be observed if the samples are cooled slightly. For these reasons it is desirable to utilize the novel temperature controlling apparatus of the present invention in the nuclear magnetic resonance spectrometers now in use in this field.

Since the samples which are being analyzed in high resolution nuclear magnetic resonance spectrometers are necessarily small in size due to the limitations in magnetic field homogeneity of the polarizing magnetic field, it is preferable that only the sample itself be heated rather than the relatively large probe structure in which the sample is positioned within the magnetic field. Also, since in this nuclear magnetic resonance work the signals obtained from the apparatus are improved by rapidly spinning the sample in the magnetic field which results in a line narrowing effect, the probe apparatus designed for heating the sample must be such as to permit the necessary spinning motion to take place.

It is the object of the present invention to provide a novel probe apparatus and affiliated parts for permitting a temperature control of the sample being analyzed by the nuclear resonance spectrometer.

One feature of the present invention is the provision of a novel sample holder apparatus for use in a nuclear magnetic resonance spectrometer probe which comprises a first tube having a radio frequency coil mounted thereon, a second sample-containing tube adapted to be held in the first tube, and means for introducing a flowing temperature-controlling fluid between the first and second tubes for controlling the temperature of the sample in said second tube.

Another feature of the present invention is the provision of a novel sample holder apparatus for use in a nuclear magnetic resonance spectrometer probe which comprises a double-cylinder tube structure with a third tube inserted axially therein and spaced therefrom, means for introducing a temperature-controlling fluid into the space between the inner wall of said tube structure and said third tube, a radio frequency coil mounted on said third tube, and a sample holder means within the third tube, there being an opening leading from said space between said inner wall and said third tube into said third tube and around said sample holder for permitting the temperature-controlling fluid to pass around the sample within the probe.

Another feature of the present invention is the provision of a novel sample holder apparatus of the above featured type in which the third tube on which the R. F. coil is mounted has a bearing located therewithin, and a fourth tube positioned within said third tube carrying the sample, said fourth tube being adapted to rotate in said bearing.

Still another feature of the present invention is the provision of a novel sample holder device of the first featured type in which the temperature-controlling fluid is introduced into the structure through a collar surrounding the structure whereby the structure and associated apparatus therein may be easily rotated within this collar.

Still another feature of the present invention is the provision of a novel sample holder device of the first featured type in which the radio frequency coil is coupled to a coaxial plug affixed to the bottom of the double cylinder structure whereby the structure may be plugged into a coaxial receptacle in the probe apparatus.

These and other features and advantages of the present invention will become more apparent upon a perusal of the following specification taken in connection with the accompanying drawings wherein, Fig. 1 is a view partly in plan and partly in cross section of a novel probe apparatus and associated apparatus for utilization in temperature control of the sample, Fig. 2 is a longitudinal cross section view of a portion of the apparatus shown in Fig. 1 which includes the sample holder, the R. F. coil mounting means, and the insulating glass casing for confining the temperature control fluid flow within the probe device, Fig. 3 is a longitudinal cross section view of still another portion of the apparatus of Fig. 1 which discloses the device utilized for spinning the sample holder in the probe, Fig. 4 is a longitudinal cross section view of another embodiment of the present invention which is somewhat similar to the apparatus shown in Fig. 2, and Fig. 5 is a longitudinal cross section view of a portion of still another embodiment of the present invention.

Referring now to Figs. 1, 2 and 3 there is shown a probe apparatus and mounting structure therefor which is adapted to be inserted between the pole faces of a large permanent or electromagnet in accordance with the functioning of a nuclear magnetic resonance high resolution spectrometer. Since these spectrometers are well-known in the art no complete description as to their operation will be attempted here but only so much of the operation needed to describe the invention herein disclosed will be described. The mounting structure for this probe apparatus comprises a long rectangular base 11 on which the main probe body 12 is fixedly attached. This base 11 and probe body 12 and all of the other apparatus utilized herein is made of a material such as aluminum or brass which is nonmagnetic and may be positioned in a strong magnetic field without disturbing the field lines.

The main probe body 12 has mounted therein in recesses and cavities the necessary apparatus other than that shown in these drawings for conducting the high resolution experiment, for example, the transmitter coil used for applying the radio frequency magnetic field to the sample in the probe to produce the necessary gyromagnetic resonance in crossed coil systems, the low frequency modulating or sweep coils utilized for sweeping the unidirectional magnetic field of the permanent or electromagnet, the necessary balancing members, if needed, for optimizing the coupling of the aforementioned transmitter coil and the receiver coil used for picking up the nuclear precession signals, and other related structural and electrical apparatus ordinarily found in such nuclear magnetic resonance probe bodies. Also, securely mounted on the base 11 on legs 13 is a brass oven 14 in which is located a 600 watt Nichrome heating element 15. An air blower 16 is adapted to send a stream of air through the brass oven 14 and into a tube 17 leading from the oven 14 into the sample holder apparatus shown in the drawings. The tube 17 is provided with a temperature measuring gauge 18 and is mounted on the probe body by means of a bracket 19. The oven 14 and tube 17 are insulated in a convenient and conventional manner. A bypass conduit 21 and needle valve 22 are utilized for controlling the flow of air through the brass oven 14 and the bypass 21 and thus controlling the temperature of the air flow. It is advisable to filter the air to prevent ferromagnetic contamination of the sample holder apparatus.

The tube 17 leading from the oven is coupled to a stub portion 23 leading into a sample holder device including two concentric glass cylinders 24 and 25 one within the other forming a Dewar type of structure. The opening through the stub 23 leads into the central glass cylinder 24 as shown in Fig. 2, the space between the central glass cylinder 24 and the outer glass cylinder 25 serving as a sealed, evacuated insulating space. The upper end of this double cylinder glass Dewar is provided with a tapered opening, the surface of which is ground. Adapted to be fitted into this tapered opening and to extend down into the inner cylinder 24 is an elongated glass tube 27 which is open at its upper end and which has a bearing 28 made of a heat resistant plastic such as Teflon secured within its lower end. The glass tube 27 has a radio frequency coil 29 wound about its lower end, the two ends 31 of the receiver coil 29 extending out through an opening 32 in the lower end of the glass member 24, 25 into electrical connection with the coaxial plug 33 of insulating material having a central connector 34 and a cylindrical outer connector 35. The coaxial plug 33 is securely cemented to the bottom surface of the glass cylinder 25 and slips into the coaxial receptacle 33' in the probe.

The inner glass tube 27 is provided with a ground surface to cooperate with the ground tapered opening in the top of the glass structure 24, 25 so that the insert tube 27 may be rotated during construction of this probe apparatus whereby the R. F. coil 29 mounted on the tube 27 may be balanced in the probe body. Such balancing is often necessary when constructing a probe device for use in a cross coil type of nuclear resonance system where a transmitter and receiver coil are employed and the receiver coil (corresponding to coil 29) must be balanced relative to the transmitter coil (not shown) in the probe. If the probe is to be used in a single coil system where only the single R. F. coil 29 is needed, this rotational balancing movement is not necessary. After initial balancing of the R. F. coil 29 (if needed) by rotation of the glass tube 27, the tube may be securely cemented within the tapered opening so that further movement of the R. F. coil 29 in the probe is prevented.

The sample-containing member of this probe device is a standard thin walled Pyrex tube 36 which is sealed closed at both ends, the lower end of the Pyrex tube which holds the sample 37 to be investigated being nestled within the bearing member 28 so that it is firmly positioned therein yet is able to rotate easily on its axis within the bearing. The upper end of the Pyrex tube 36 extends out through the top of the glass tubing 27 and is firmly affixed in a spinning apparatus which is designed in the form of an air turbine as described below to rapidly spin the glass tube 36 and thus spin the sample 37 within the probe. The lower end of the tube 27 is provided with a plurality of small holes 27' girdling the tube just above the bearing 28 and in close vicinity to the sample 37. The temperature-controlling air flows through the stub 23 and into the center of the Dewar device and passes down between the inner wall 24 through these openings 27' in surrounding relationship to the sample and up between the inner surface of the tube 27 and the tube 36 and exhausts out through the top of the tube 27. A thin wire thermocouple may be inserted into the double-wall structure through the stub 23 for temperature measurement, if desired.

The spinner apparatus comprises a hollow cylindrical collar 38 secured to the main probe body 12. The lower outer surface of this collar 38 is threaded to accommodate an annular member 39 which is threaded onto the collar over the Dewar device 24, 25. Slipped over and press fitted on the upper end of the collar 38 after the Dewar device 24, 25 has been positioned in the probe is a hollow cylindrical housing 39'. The housing 39' has openings 41 in opposite sides thereof through which the stub 23 may extend from the Dewar device and through which the seal-off nipple on the Dewar device may extend. Threaded onto the housing 39 is the substantially cylindrical metallic mounting member 42 which mounts the turbine. Secured within this mounting member 42 is a turbine nest 43 which has an annular air passage 44 formed between it and the mounting member 42. A plurality of circumferentially spaced air holes 45 connect the annular air passage 44 through approximately tangentially to the outer surface of the tapered nest. A stub member 46 adapted to be coupled to an air hose or the like is affixed to the housing 42 and provides an air passage thereto. Secured axially within the turbine nest 43 is a plastic bearing 47. A heat resistant plastic washer 47' is secured to the underside of the nest 43 and bearing 47 to protect these latter members from the hot air blast emitted through the top of tube 27. Set in the turbine nest and exending into the bearing is a rugged plastic turbine 48. This turbine 48 has a plurality of small recesses in the underside thereof which are acted upon by the air stream passing through the holes 45 to rotate the turbine 48 at a rapid speed in its bearing. The turbine 48 is provided with a vertical neck portion 49 having a retainer ring 51 encircling it through which the glass tube 36 is snugly fitted, this neck portion 49 grasping the class tube 36 and rotating it along with the turbine 48 to thereby rapidly rotate the sample 37 in the Dewar device.

Referring now to Fig. 4 there is shown another embodiment of the invention which utilizes a Dewar device and associated apparatus similar to that shown in Fig. 2. In this instance, however, the outer glass cylinder 52 of the Dewar device is shortened and sealed closed at a point just below the section of the Dewar into which the temperature control air is introduced. The openings 53 through which the air is introduced into the Dewar device is located in the inner cylinder 54, the air passing down between this inner cylinder 54 and the central glass tubing 55 and thus through the holes 56 in the tubing 55 around the sample 37 and out through the top. It will be noted that the inner tubing 55 is no longer fitted by means of a tapered hole but is formed in one piece with the inner and outer cylinders of the Dewar device. This is possible since the complete Dewar device may be rotated within the probe structure for balancing the R. F. coil 29 relative to the probe structure as described above rather than having the inner tube alone rotate. This rotation of the Dewar device is possible since the stub through which the air is introduced into the Dewar is no longer an integral part of the Dewar device but is rotatably mounted thereon. This air stub 56 is secured in an annular collar 57 divided into three annular sections, the two outer sections carrying heat resistant flexible rings or washers 58 made, for example, of silicon gum polymer and the inner section 59 serving as an air chamber which directs the air from the stub 56 through the plurality of holes 53 girdling the inner wall 54 of the Dewar. The flexible rings 58 grip the Dewar in an air-tight fashion so as to prevent the escape of air from the collar 57 yet permit the Dewar device to be rotated within this collar.

Another apparatus which may be utilized in place of the annular collar 57 disclosed in Fig. 4 is shown in longitudinal section view in Fig. 5. In this case the air chamber is formed in a single glass collar 61 which is tapered slightly to fit over the tapered end of the double-cylinder structure 62. This collar could be made of material other than glass, for example, an elastic cap of silicon gum polymer. This cap 62 prevents the escape of air from around the Dewar yet permits the Dewar device to be readily rotated within the probe. Although an oven is shown for heating the air, it is to be understood that a cooling device could be utilized should one desire to lower the temperature of the sample.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Sample holder apparatus for use in a gyromagnetic resonance spectrometer device comprising a first tube structure having a radio frequency coil mounted thereon, a second tube structure adapted to contain a sample of matter mountable in said first tube, and means for introducing a flowing temperature-controlled fluid between said first and second tubes for controlling the temperature of the sample in said second tube.

2. Sample holder apparatus for use in a gyromagnetic resonance spectrometer device comprising a double cylinder tube structure having an insulating space between the cylinders and having an opening therein for introducing a flowing fluid into the inner tube, a third tube mounted concentrically in said structure, a radio frequency coil mounted on said third tube, said third tube being adapted to support a sample holder means therein in the vicinity of said radio frequency coil, said third tube having an opening therein for permitting the flowing fluid to pass into said third tube and around said sample holder means whereby the gyromagnetic resonance sample may be controlled relative to its temperature.

3. Sample holder apparatus as claimed in claim 2 including a coaxial plug mounted on one end of said double cylinder tube structure and having the ends of said radio frequency coil electrically coupled thereto.

4. In combination with the sample holder apparatus of claim 3, a probe adapted to be inserted within the gap of a magnet comprising a main body portion having a recess therein to accommodate said sample holder apparatus and a coaxial receptacle means mounted within said main body for engaging said coaxial plug when said sample holder apparatus is inserted into said recess.

5. Apparatus as claimed in claim 2 wherein said third tube has a bearing mounted therein and including as said sample holder means a narrow tube nestled in said bearing and carrying said sample.

6. In combination with the sample holder apparatus of claim 2, a probe adapted to be inserted within the gap of a magnet comprising a main body portion having a recess therein to accommodate said sample holder apparatus so that the sample holder means inserted within said sample holder apparatus will extend outside said probe body, and sample rotating apparatus mounted on said probe body for coupling to said sample holder means, said sample rotating apparatus comprising an air turbine for rotating said sample holder means within said sample holder apparatus.

7. Apparatus as claimed in claim 6 wherein said rotating apparatus comprises a turbine nest mounted on said probe body, a turbine nestled in said turbine nest and having an air jet directed thereto for rotating said turbine, and said turbine being adapted to grip the sample holder means for rotating said sample holder means with said turbine.

8. In combination with the sample holder apparatus as claimed in claim 2, a probe structure adapted to be inserted within the gap of a magnet comprising a main body portion having a recess therein into which said sample holder may be inserted, a base member on which said probe is mounted, an oven mounted on said base member, blower apparatus for flowing fluid through said oven, and a fluid conduit means coupling said oven to said double cylinder tube structure for introducing the flowing fluid into said structure.

9. Sample holder apparatus for use in a gyromagnetic resonance spectrometer device comprising a double cylinder tube structure having an insulating space between the cylinders and having an opening therein for introducing a fluid into the inner tube, a third tube mounted concentrically in said structure, a radio frequency coil mounted on said third tube, and a sample holder means located within said third tube and said R. F. coil, said third tube having an opening therein for permitting the fluid to pass into said third tube and around said sample holder whereby the gyromagnetic resonance sample may be controlled relative to its temperature.

10. Apparatus as claimed in claim 9 including a bearing in said third tube, said gyromagnetic sample holder nestling in said bearing.

11. Apparatus as claimed in claim 9 including a coaxial plug mounted on the lower end of said structure and having the ends of said R. F. coil electrically coupled thereto.

12. Apparatus as claimed in claim 9 wherein said doubled cylinder tube structure is glass and has a tapered ground opening in the upper end thereof, said third tube being glass and having a tapered ground end adapted to fit within the tapered opening in said glass structure.

13. Sample holder apparatus for use in a gyromagnetic resonance spectrometer device comprising a double cylinder tube structure having an insulating space between the cylinders and having an opening therein for introducing a flowing fluid into the inner tube, means within said inner tube for supporting a sample therein and having a radio frequency coil coupled thereto for electromagnetic coupling with said sample holder, and a member encircling said double cylinder tube structure having a fluid chamber therein, said member being adapted for rotational motion around said double cylinder tube structure, the fluid chamber of said member being coupled to the opening in said double cylinder tube structure for introducing the flowing fluid into said inner tube whereby it circulates around said sample supporting means for controlling the temperature of any sample therewithin.

14. Apparatus as claimed in claim 13 wherein said member comprises an annular collar having an annular fluid chamber therein surrounding the double cylinder wall structure, the annular fluid chamber cooperating with the opening in said wall structure for delivering fluid thereto, said annular member being rotatable on said structure.

15. Sample holder apparatus for use in a gyromagnetic resonance device comprising a double cylinder tube structure having an insulated space between the cylinders and having an opening therein for introducing a flowing fluid into the inner tube, a third tube mounted within said double cylinder structure, said third tube being adapted to support a sample holder member containing a sample which is to undergo the gyromagnetic resonance, said third tube having an opening therein for permitting flowing fluid to pass into said third tube and around said sample holder member whereby the gyromagnetic resonance sample may be controlled relative to its temperature, and a radio frequency coil mounted on said sample holder apparatus in electromagnetic coupling relationship to the sample when in said sample holder member.

16. Sample holder apparatus as claimed in claim 15 including a coaxial plug mounted on one end of said double cylinder tube structure and having the ends of said radio frequency coil electrically coupled thereto.

17. Apparatus as claimed in claim 15 wherein said third tube has a bearing mounted therein and including a narrow sample holding tube nestled in said bearing and containing said sample.

18. Sample holder apparatus for use in a gyromagnetic resonance device comprising an outer insulating tube means having an opening therein for introducing a flowing fluid into said tube means, another tube mounted within said insulated tube means, said other tube being adapted to support a sample holder member containing a sample which is to undergo the gyromagnetic resonance, said other tube having an opening therein for permitting the flowing fluid to pass into said other tube and around said sample holder member whereby the gyromagnetic resonance sample may be controlled relative to its temperature, and a radio frequency coil mounted on said sample holder apparatus in electromagnetic coupling relationship to the sample when in said sample holder member.

19. Sample holder apparatus for use in a gyromagnetic resonance spectrometer device comprising a first tube structure having a radio frequency coil mounted thereon, a second tube structure adapted to contain a sample of matter mountable in said first tube structure, means for introducing a flowing temperature-controlled fluid between said first and second tube structures for controlling the temperature of the sample in said second tube structure, and means for spinning said sample in said sample holder apparatus.

20. Sample holder apparatus for use in a gyromagnetic resonance device comprising an insulating tube structure adapted to serve as an insulator for maintaining members within the tube structure at constant temperatures and having an opening therein for introducing a flowing fluid therein, another tube mounted within said insulating tube structure, said other tube being adapted to support a sample holder member containing a sample which is to undergo the gyromagnetic resonance, said other tube having an opening therein for permitting the flowing fluid to pass around said sample holder member and out through said other tube whereby the gyromagnetic resonance sample may be controlled relative to its temperature, and a radio frequency coil mounted on said sample holder apparatus in electromagnetic coupling relationship to the sample when in said sample holder member.

References Cited in the file of this patent

Gutowsky et al.: Review of Scientific Instruments, vol. 24, No. 8, August 1953, pp. 644–652.

Bloch et al.: Physical Review, vol. 94, No. 2, April 15, 1954, pp. 496–498.